Patented Jan. 20, 1953

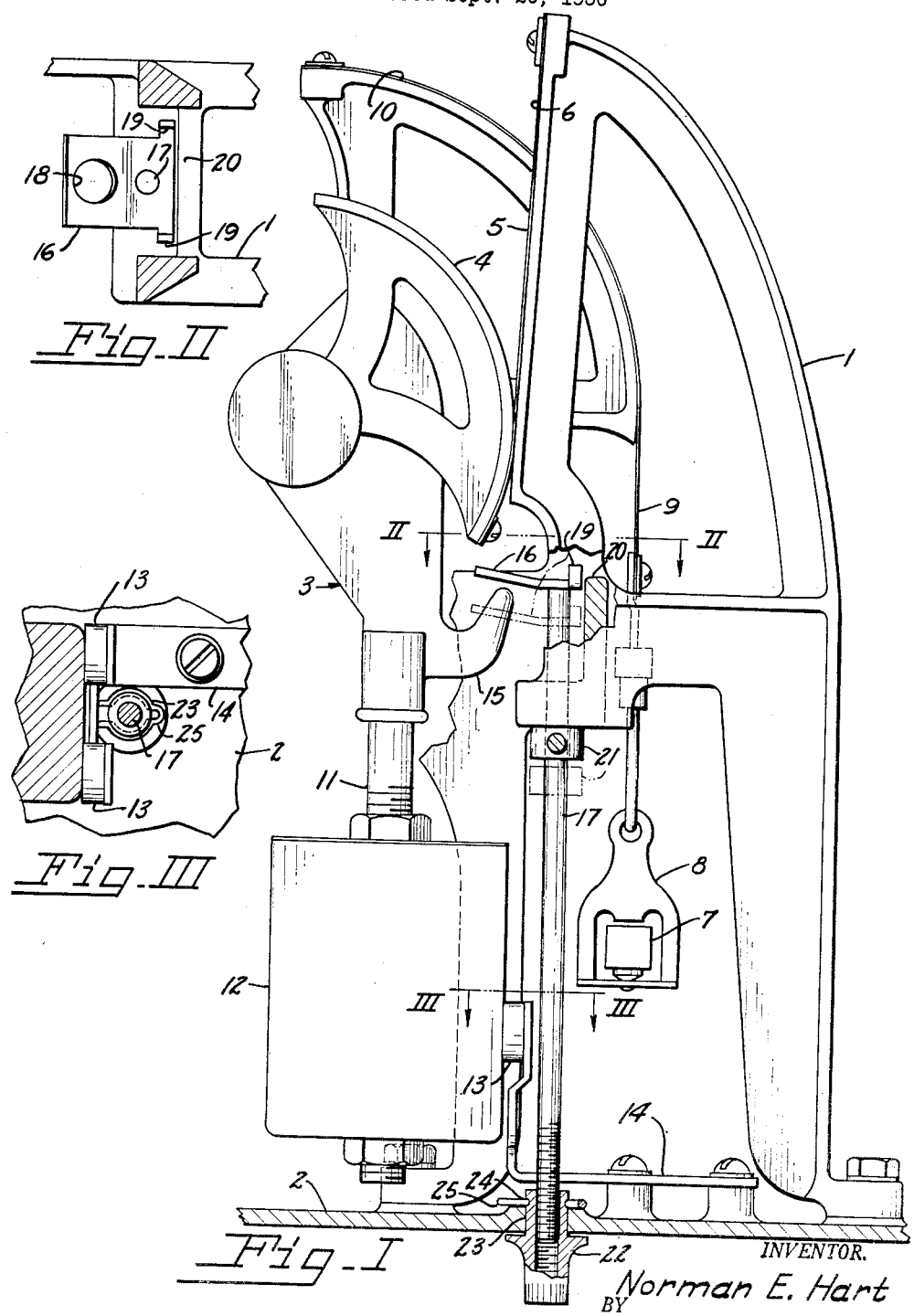

2,626,143

UNITED STATES PATENT OFFICE 2,626,143

PENDULUM LOCK

Norman E. Hart, Toledo, Ohio, assignor to Toledo Scale Company, Toledo, Ohio, a corporation of New Jersey Application September 20, 1950, Serial No. 185,764

1 Claim. (Cl. 265—62)

This invention relates to pendulum weighing scales and in particular to an improved structure for locking the pendulum in its no load position when the scale is being shipped or moved from place to place.

It has been customary to provide a weighing scale pendulum with a locking horn that is engaged by a perforated plate moved into locking position by the force of a spring. While such a construction protects the pendulum from excessive locking force it does not provide positive locking force since a severe jar or bump may force the lock against the spring and thus release the pendulum.

The principal object of this invention is to provide a positive locking mechanism arranged so that excessive force can not be applied to the pendulum.

Another object of the invention is to provide an easily manufactured, inexpensive assembly for locking the pendulum.

More specific objects and advantages are apparent from the following description of a preferred form of the invention as illustrated in the accompanying drawings.

In the drawings:

Figure I is an elevation of a weighing scale pendulum, the supporting frame therefor, and a locking mechanism for holding the pendulum in its zero load position.

Figure II is a fragmentary horizontal section taken along the line II—II of the Figure I.

Figure III is a fragmentary horizontal section taken susbtantially along the line III—III of Figure I.

These specific figures and the accompanying description are intended merely to illustrate the invention but not to impose limitations on its scope.

Referring now to the accompanying drawings, a sector guide or pendulum supporting framework 1 is erected from a base 2 and serves to support a pendulum 3. The pendulum 3 has fulcrum sectors 4, to the lower ends of which fulcrum ribbons 5 are attached. The fulcrum ribbons 5 lie against and are attached to the upper ends of a slightly inclined face 6 of the sector guide 1. The fulcrum ribbons 5 thus serve to support the pendulum 3 and allow it to roll upwardly along the face 6 as it counterbalances load force.

Load forces are applied through a lever 7 to a stirrup 8 that is suspended from a load ribbon 9. The upper end of the load ribbon 9 overlies a load sector 10 and is attached to the upper end thereof. The load sector 10 is eccentric to the fulcrum sector 4 as well as being larger in radius so that downwardly applied force transmitted through the load ribbon 9 causes the pendulum to roll upwardly on the fulcrum ribbons 5.

The pendulum also includes a downwardly extending threaded stem 11 that carries a pendulum weight 12. The position of the pendulum weight 12 along the threaded stem 11 determines the load counterbalancing capacity of the pendulum.

A yoke, not shown in the drawings, is supported from the pendulum 3 at the center of rotation of the fulcrum sectors 4. The yoke carries a rack that engages a pinion mounted on an indicator shaft.

The lower limit of travel of the pendulum behind its zero load position is determined by a pair of rubber bumpers 13 carried on a bumper bracket 14 secured to the base 2 of the scale.

When it is desired to move the scale or pack it for shipment the pendulum 3 must be locked in its zero load position. For this purpose the pendulum is provided with an upwardly directed locking horn 15 that is engaged by a perforated plate 16 carried on the upper end of a locking rod 17 slidably mounted on the frame 1 and base 2. The perforated plate 16, as seen in Figure II, has a large opening 18 to receive the locking horn 15 and has a pair of laterally extending ears 19 that loosely engage an adjacent web 20 of the frame 1 to prevent rotation of the plate 16 or the rod 17.

The rod 17 carries a collar 21 which strikes a portion of the frame 1 to limit the upward travel of the rod at a position such that the plate 16 is disengaged from the locking horn 15 but is not raised far enough to interfere with any other portion of the pendulum.

The lower end of the rod 17 is threaded into a shouldered knurled nut 22. The knurled nut 22 has a cylindrical portion 23 journaled in a hole through the base 2 and a groove 24 to receive a spring clip 25 that prevents the knurled nut 22 from moving axially with respect to the base 2. The groove 24 is deep enough so that the spring clip 25 can not be disengaged by force exerted along the axis of the rod 17.

In this arrangement when it is desired to lock the pendulum the load is removed from the scale so that the pendulum hangs in its zero position as shown in the drawing and then the knurled nut 22 is turned on the rod 17 to draw the rod 17 downwardly to engage the perforated plate 16 over the locking horn 15. This rotation of the nut 22 is continued until the nut 22 is drawn up finger tight. The force exerted securely clamps the pendulum against the guide surface 6 and bumpers 13. Unless a wrench or other tool is applied to the knurled nut the tension that can be exerted in the sector ribbons 5 by tightening the knurled nut 22 is not enough to damage the ribbons.

When it is desired to unlock the scale the nut 22 is turned in the opposite direction thus raising the rod 17 and the locking plate until the collar 21 is driven against the adjacent surface of the frame 1. This stops further movement of the rod 17 and the knurled nut tightens with the spring clip 25 forced against the adjacent surface of the base 2. In this position the locking mechanism is entirely free of the pendulum or other weighing mechanism and is held in such position so that there is no possible interference with normal weighing operation of the scale.

Various modifications in specific details of construction may be made without departing from the spirit and scope of the invention.

I claim:

In a lock for a pendulum of a weighing scale, in combination, a base, a frame erected from the base, a pendulum supported on the frame, a locking horn on the pendulum, a rod mounted for vertical movement in the frame, a perforated plate mounted on the rod for engaging the locking horn, a nut rotatably mounted in the base and threaded onto the rod, a spring clip engaging a groove in the nut and the adjacent surface of the base to hold the nut in position, and means on the rod to limit the upward travel of the rod.

NORMAN E. HART.

REFERENCES CITED

The following references are of record in the file of this patent:

UNITED STATES PATENTS

| Number | Name | Date |
| --- | --- | --- |
| 1,606,938 | Hem | Nov. 16, 1926 |
| 1,616,106 | Bourgon | Feb. 1, 1927 |